(12) United States Patent
Nomura

(10) Patent No.: US 7,577,515 B2
(45) Date of Patent: Aug. 18, 2009

(54) NAVIGATION APPARATUS, UPDATE DATA PROVIDING APPARATUS AND UPDATE DATA PROVIDING METHOD

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 390 days.

(21) Appl. No.: 10/580,111

(22) PCT Filed: Nov. 19, 2004

(86) PCT No.: PCT/JP2004/017243

§ 371 (c)(1),
(2), (4) Date: May 19, 2006

(87) PCT Pub. No.: WO2005/050594

PCT Pub. Date: Jun. 2, 2005

(65) Prior Publication Data

US 2007/0106463 A1 May 10, 2007

(30) Foreign Application Priority Data

Nov. 19, 2003 (JP) ............................. 2003-389377

(51) Int. Cl.
*G01C 21/00* (2006.01)
(52) U.S. Cl. .................. 701/200; 701/35; 701/211; 340/995.18
(58) Field of Classification Search ............... 701/35, 701/200, 207, 208, 209–211; 340/995.1, 340/995.14, 995.18
See application file for complete search history.

(56) References Cited

U.S. PATENT DOCUMENTS

| 6,246,958 | B1 * | 6/2001 | Hirono | 701/208 |
| 7,034,791 | B1 * | 4/2006 | Odom | 345/98 |
| 2002/0013659 | A1 * | 1/2002 | Kusama | 701/211 |

FOREIGN PATENT DOCUMENTS

| JP | 2001-056823 A | 2/2001 |
| JP | 2002-296052 A | 10/2002 |
| JP | 2002-323329 A | 11/2002 |
| JP | 2003-042781 A | 2/2003 |
| JP | 2003-75174 A | 3/2003 |
| JP | 2003-156343 A | 5/2003 |
| JP | 2003-161620 A | 6/2003 |
| JP | 2003-195743 A | 7/2003 |
| JP | 2003-315058 A | 11/2003 |
| JP | 2003-315063 A | 11/2003 |

OTHER PUBLICATIONS

International Search Report dated Feb. 22, 2005 (One (1) page).

* cited by examiner

*Primary Examiner*—Gertrude Arthur Jeanglaud
(74) *Attorney, Agent, or Firm*—Crowell & Moring LLP

(57) ABSTRACT

A type of data among road data, route search data and route guidance data or a type of background data is specified to be updated. When updating either one of the road data, the route search data and the route guidance data, the entire data of the corresponding type stored in a hard disc 12 are updated. When updating the type of background data, data are updated in units of blocks corresponding to a specified range.

17 Claims, 13 Drawing Sheets

FIG. 2

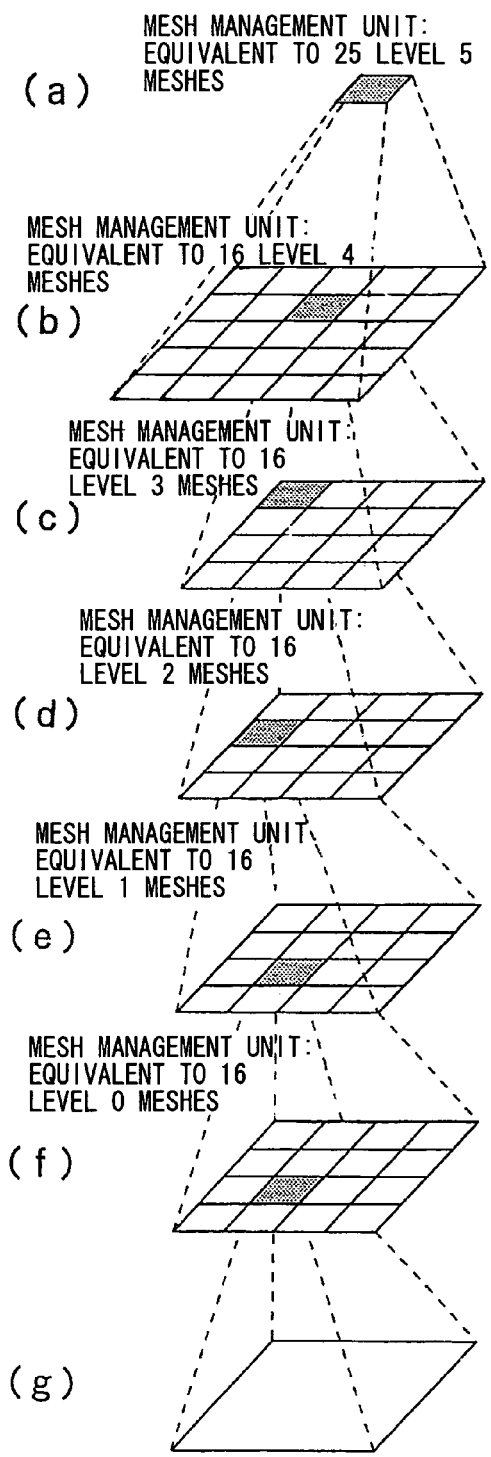

(a) MESH MANAGEMENT UNIT: EQUIVALENT TO 25 LEVEL 5 MESHES
(b) MESH MANAGEMENT UNIT: EQUIVALENT TO 16 LEVEL 4 MESHES
(c) MESH MANAGEMENT UNIT: EQUIVALENT TO 16 LEVEL 3 MESHES
(d) MESH MANAGEMENT UNIT: EQUIVALENT TO 16 LEVEL 2 MESHES
(e) MESH MANAGEMENT UNIT: EQUIVALENT TO 16 LEVEL 1 MESHES
(f) MESH MANAGEMENT UNIT: EQUIVALENT TO 16 LEVEL 0 MESHES
(g)

LEVEL 6:

| BLOCK MANAGEMENT UNIT | 40 X 40 (1600) PRIMARY MESHES |
| MESH MANAGEMENT UNIT | 1600 PRIMARY MESHES |
| MESH MANAGEMENT NUMBER | 1 |
| BLOCK MANAGEMENT NUMBER | 1 (THE ENTIRE LAND MASS OF JAPAN) |

LEVEL 5:

| BLOCK MANAGEMENT UNIT | 40 X 40 (1600) PRIMARY MESHES |
| MESH MANAGEMENT UNIT | 64 PRIMARY MESHES |
| MESH MANAGEMENT NUMBER | 25 |
| BLOCK MANAGEMENT NUMBER | 1 (THE ENTIRE LAND MASS OF JAPAN) |

LEVEL 4:

| BLOCK MANAGEMENT UNIT | 40 X 40 (1600) PRIMARY MESHES |
| MESH MANAGEMENT UNIT | 4 PRIMARY MESHES |
| MESH MANAGEMENT NUMBER | 400 |
| BLOCK MANAGEMENT NUMBER | 1 (THE ENTIRE LAND MASS OF JAPAN) |

LEVEL 3:

| BLOCK MANAGEMENT UNIT | 8 X 8 (64) PRIMARY MESHES |
| MESH MANAGEMENT UNIT | 1/4 PRIMARY MESH |
| MESH MANAGEMENT NUMBER | 256 |
| BLOCK MANAGEMENT NUMBER | 9 (THE ENTIRE LAND MASS OF JAPAN) |

LEVEL 2:

| BLOCK MANAGEMENT UNIT | 4 X 4 (16) PRIMARY MESHES |
| MESH MANAGEMENT UNIT | SECONDARY MESH |
| MESH MANAGEMENT NUMBER | 1024 |
| BLOCK MANAGEMENT NUMBER | 9 X 4 = 36 (THE ENTIRE LAND MASS OF JAPAN) |

LEVEL 1:

| BLOCK MANAGEMENT UNIT | ONE PRIMARY MESH |
| MESH MANAGEMENT UNIT | 2.5TH-ORDER MESH (1/16 SECONDARY MESH) |
| MESH MANAGEMENT NUMBER | 1024 |
| BLOCK MANAGEMENT NUMBER | 9 X 4 X 16 = 576 (THE ENTIRE LAND MASS OF JAPAN) |

LEVEL 0:

| BLOCK MANAGEMENT UNIT | 2 X 2 (4) SECONDARY MESHES |
| MESH MANAGEMENT UNIT | 3.5TH-ORDER MESH (1/256 SECONDARY MESH) |
| MESH MANAGEMENT NUMBER | 1024 |
| BLOCK MANAGEMENT NUMBER | 9 X 4 X 16 X 16 = 9216 (THE ENTIRE LAND MASS OF JAPAN) |

FIG. 3

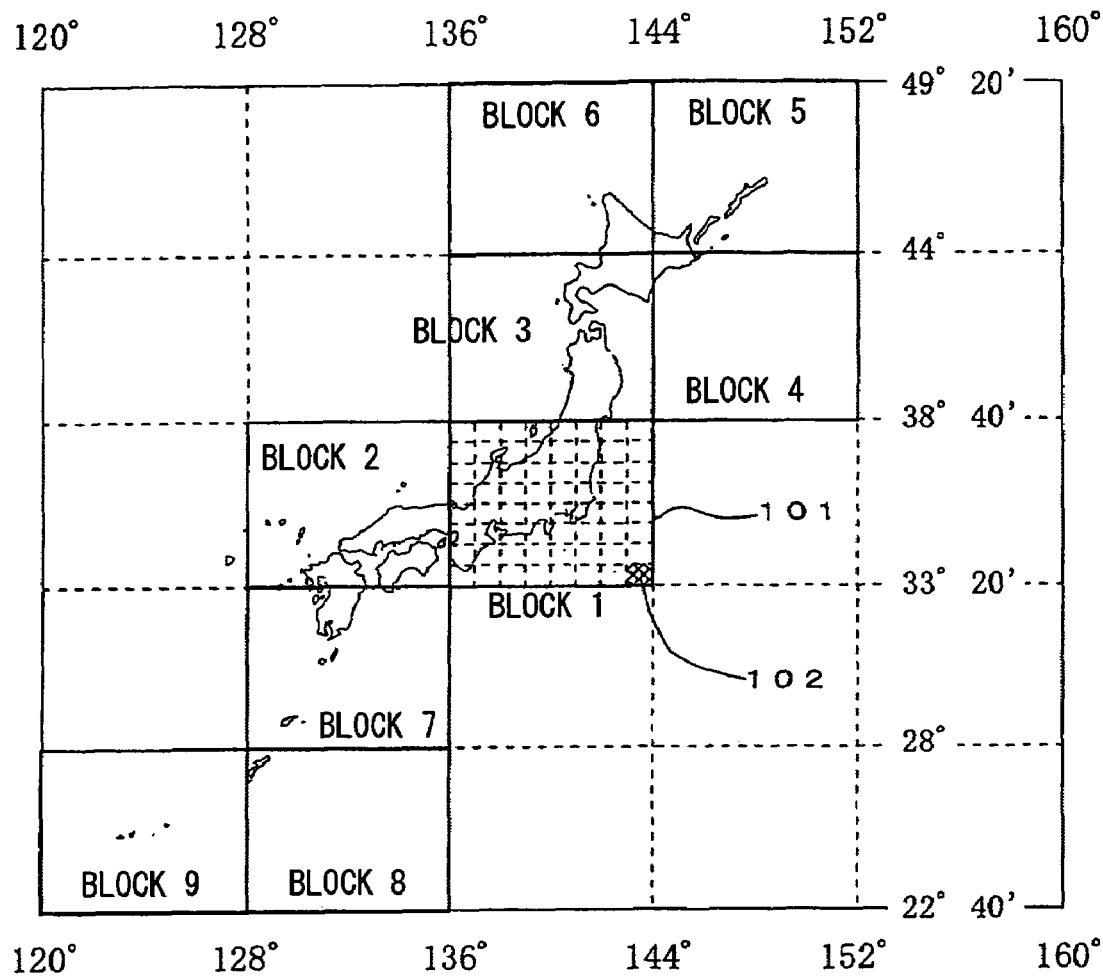

BLOCK 1: AREA AROUND TOKYO
BLOCK 2: AREA CONTAINING THE CHUGOKU AND SHIKOKU REGIONS
BLOCK 3: AREA CONTAINING THE TOHOKU REGION
BLOCK 4: AREA AROUND NEMURO, HOKKAIDO
BLOCK 5: AREA AROUND SHIRETOKO PENINSULA, HOKKAIDO
BLOCK 6: AREA AROUND WAKKANAI, HOKKAIDO
BLOCK 7: AREA AROUND KAGOSHIMA, KYUSHU
BLOCK 8: AREA CONTAINING THE MAIN ISLAND OF OKINAWA
BLOCK 9: AREA AROUND ISHIGAKI ISLAND

FIG.7
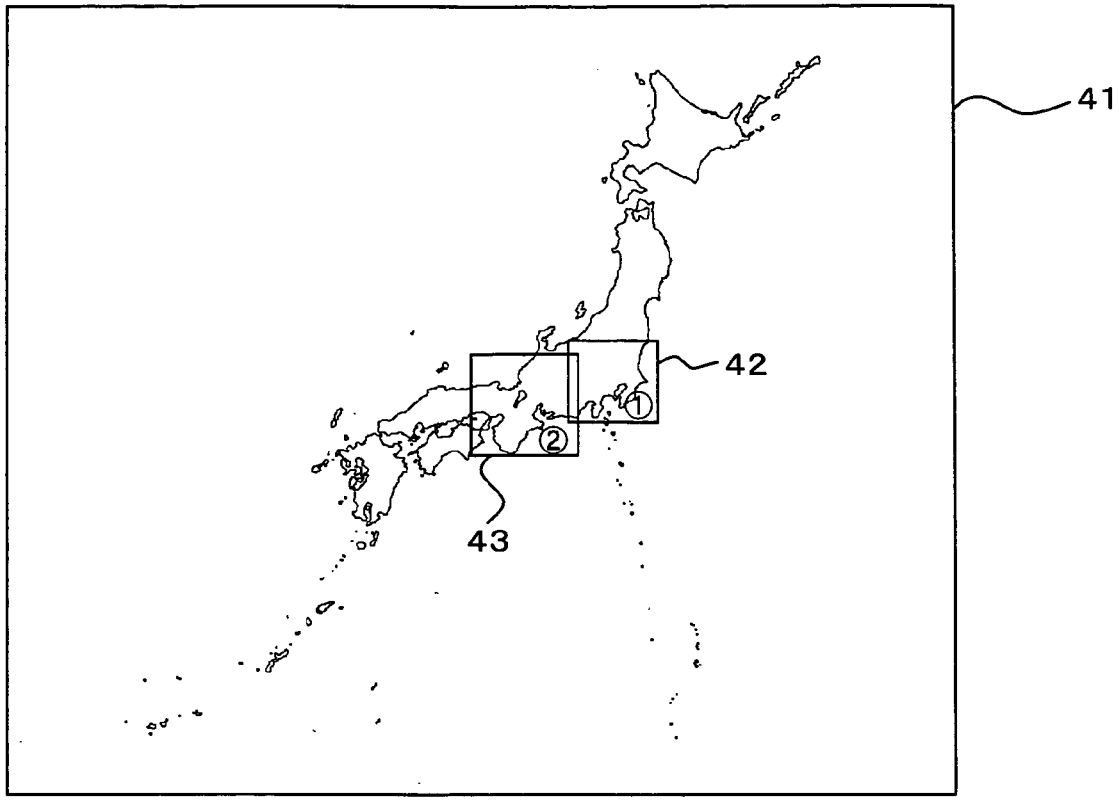
FIG.8
(a)
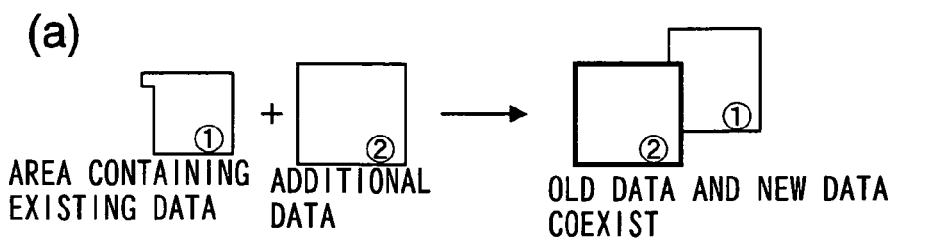
(b)
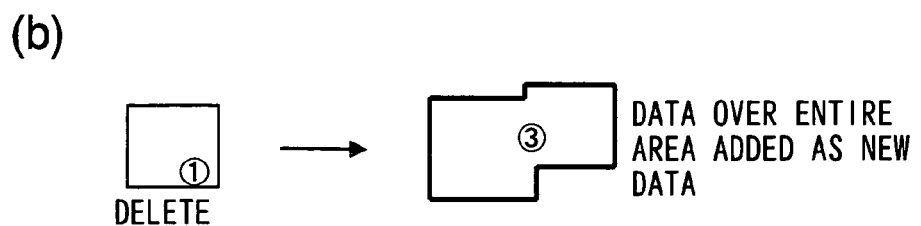

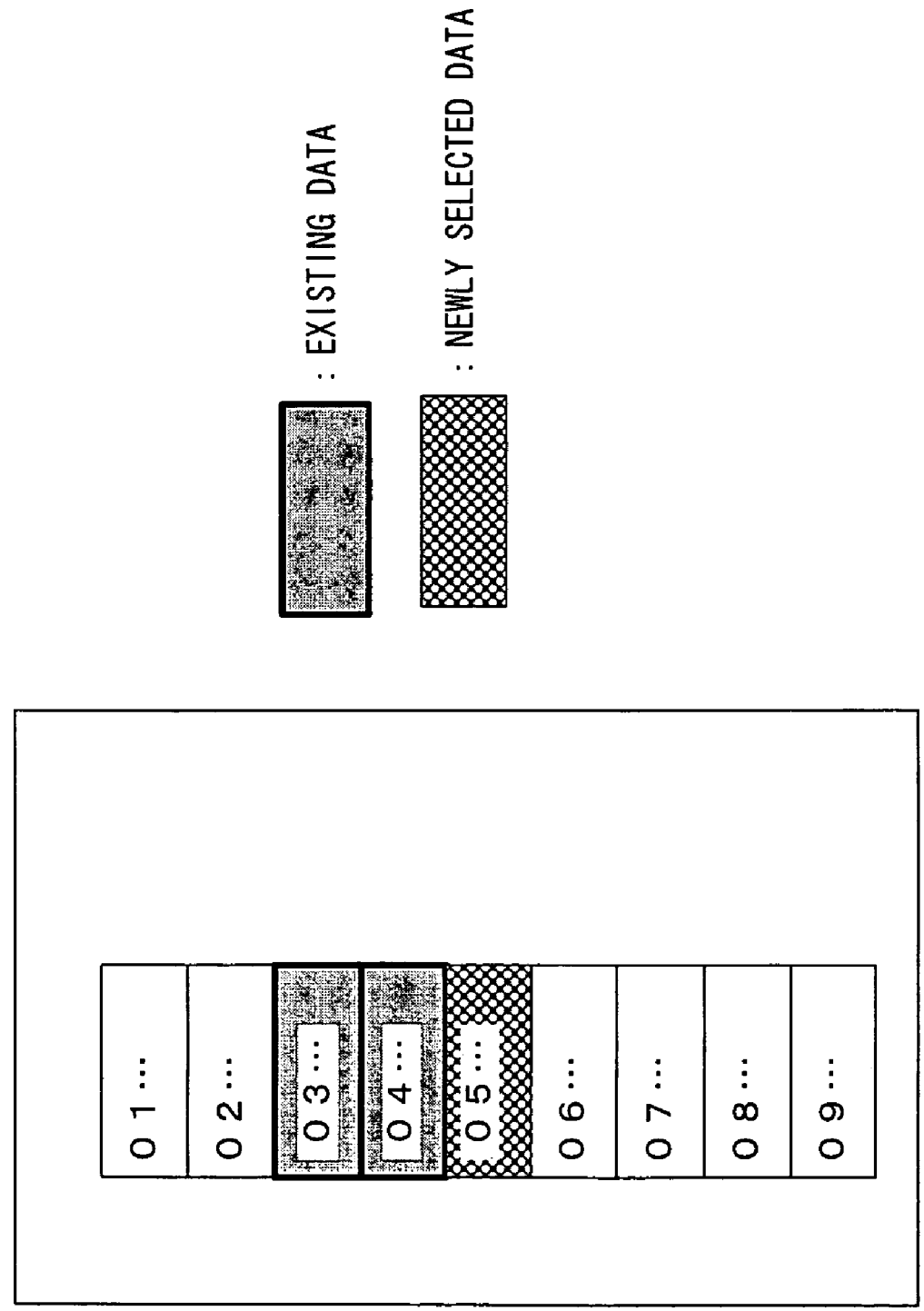

FIG. 12

: EXISTING DATA

: NEWLY SELECTED DATA

| GUNMA PREFECTURE | AIKAWA TOWN | ATSUGI CITY | AYASE CITY | | | | | | | | | |
|---|---|---|---|---|---|---|---|---|---|---|---|---|
| SAITAMA PREFECTURE | ISEHARA CITY | EBINA CITY | OISO TOWN | | | | | | | | | |
| CHIBA PREFECTURE | OI TOWN | ODAWARA CITY | KAISEI TOWN | | | | | | | | | |
| | KAMAKURA CITY | | | | | | | | | | | |
| | ASO WARD, KAWASAKI CITY | | | | | | | | | | | |
| | KAWASAKI WARD, KAWASAKI CITY | | | | | | | | | | | |
| | SAIWAI WARD, KAWASAKI CITY | | | | | | | | | | | |
| TOKYO | TAKATSU WARD, KAWASAKI CITY | | | | | | | | | | | |
| | TAMA WARD, KAWASAKI CITY | | | | | | | | | | | |
| | NAKAHARA WARD, KAWASAKI CITY | | | | | | | | | | | |
| | MIYAMAE WARD, KAWASAKI CITY | | | | | | | | | | | |
| KANAGAWA PREFECTURE | KIYOKAWA VILLAGE | SAGAMIKO TOWN | SAGAMIHARA CITY | | | | | | | | | |
| NIIGATA PREFECTURE | SAMUKAWA TOWN | ZAMA CITY | SHIROYAMA TOWN | | | | | | | | | |
| TOYAMA PREFECTURE | ZUSHI CITY | | | | | | | | | | | |
| .. | .. | | | | | | | | | | | |

NAVIGATION APPARATUS, UPDATE DATA PROVIDING APPARATUS AND UPDATE DATA PROVIDING METHOD

TECHNICAL FIELD

The present invention relates to a navigation apparatus, an update data providing apparatus and an update data providing method.

BACKGROUND ART

There is a technology known in the related art adopted in car navigation apparatuses, whereby a map is divided into a plurality of units, a map data file is created in correspondence to each unit and the map data files are updated individually in correspondence to the respective units (see, for instance, patent reference literature 1).

Patent reference literature 1: Japanese Laid Open Patent Publication No. 2001-56823

DISCLOSURE OF THE INVENTION

Problems to be Solved by the Invention

Updating map data in separate units as described above is problematic in that the overhead in the map data use may become highly significant depending upon the number of times the map data have been updated.

Means for Solving the Problems

According to the 1st aspect of the invention, a navigation apparatus comprises: a storage device in which first data and second data that are a different type of data from the first data are stored; and a control device that controls road guidance including map display by using the first data and the second data, wherein: the control device updates the first data in a first update unit and updates the second data in a second update unit different from the first update unit.

According to the 2nd aspect of the invention, in the navigation apparatus according to the 1st aspect, it is preferred that: the first data are related to map display; the second data are related to road connections; and the first update unit represents a predetermined map range and the second update unit represents a range greater than the predetermined map range.

According to the 3rd aspect of the invention, in the navigation apparatus according to the 1st aspect, it is preferred that: the first data are background data used for map display; the second data are at least one type of data among road data used to locate a position on a road, route search data used in route search and route guidance data used for route guidance; the first update unit represents a predetermined map range; and the second update unit represents a range greater than the predetermined map range.

According to the 4th aspect of the invention, in the navigation apparatus according to the 1st aspect, it is preferred that: the first data are at least one type of search data among name search data, telephone number search data and street address search data used to locate a position on a map; the second data are at least one type of data among road data used to locate a position on a road, route search data used in route search and route guidance data used for route guidance; the first update unit is set so as to update part of the first data stored in the storage device; and the second update unit corresponds to the entire second data stored in the storage device.

According to the 5th aspect of the invention, in the navigation apparatus according to any of the 1st through 3rd aspects, it is preferred that the second update unit corresponds to the entire second data stored in the storage device.

According to the 6th aspect of the invention, in the navigation apparatus according to the 4th or the 5th aspect, it is preferred that: when new data are to be added to the first data, the control device adds the new data to the first data in the first update unit; and when new data are to be added to the second data, the control device updates the entire second data stored in the storage device and adds the new data to the second data.

According to the 7th aspect of the invention, in the navigation apparatus according to any of the 1st through 6th aspects, it is preferred that there is further provided an input device to which update data to be used to update the first data, output from an update data providing apparatus in the first update unit, and update data to be used to update the second data, output from the update data providing apparatus in the second update unit, are input.

According to the 8th aspect of the invention, in the navigation apparatus according to any of the 1st through 7th aspects, it is preferred that there are further provided: a navigation-side update specifying device that specifies at least either the first data or the second data as a type of data to be updated and an update range; and an output device that outputs to an update data providing apparatus information indicating the specified type of data to be updated and the update range.

According to the 9th aspect of the invention, an update data providing apparatus that provides update data to be used to update first data and update data to be used to update second data of a data type different from the first data to a navigation apparatus which controls road guidance including map display by using the first data and the second data, comprises: an update data storage device in which the update data to be used to update the first data and the update data to be used to update the second data are stored; and an update data output device that outputs to the navigation apparatus the update data for the first data in a first update unit and outputs to the navigation apparatus the update data for the second data in a second update unit different from the first update unit.

According to the 10th aspect of the invention, in the update data providing apparatus according to the 9th aspect, it is preferred that: the first data are related to map display; the second data are related to road connections; and the first update unit represents a predetermined map range and the second update unit represents a range greater than the predetermined map range.

According to the 11th aspect of the invention, in the update data providing apparatus according to the 9th aspect, it is preferred that: the first data are background data used for map display; the second data are at least one type of data among road data used to locate a position on a road, route search data used in route search and route guidance data used for route guidance; the first update unit represents a predetermined map range; and the second update unit represents a range greater than the predetermined map range.

According to the 12th aspect of the invention, in the update data providing apparatus according to the 9th aspect, it is preferred that: the first data are at least one type of search data among name search data, telephone number search data and street address search data used to locate a position on a map; the second data are at least one type of data among road data used to locate a position on a road, route search data used in route search and route guidance data used for route guidance; the first update unit is set so as to update part of the first data stored in the storage device; and the second update unit corresponds to the entire second data stored in the storage device.

According to the 13th aspect of the invention, in the update data providing apparatus according to any of the 9th through 11th aspects, it is preferred that the second update unit corresponds to the entire second data stored in the navigation apparatus.

According to the 14th aspect of the invention, in the update data providing apparatus according to the 12th or 13th aspect, it is preferred that: when new data are to be added to the first data at the navigation apparatus, the update data output device outputs the new data to be added to the first data in the first update unit; and when new data are to be added to the second data at the navigation apparatus, the update data output device outputs update data for the entire second data stored in the navigation apparatus and the new data to be added to the second data.

According to the 15th aspect of the invention, in the update data providing apparatus according to any of the 9th through 14th aspects, it is preferred that: there is further provided an output specifying device that specifies either the first data or the second data as a type of update data to be output to the navigation apparatus and an update range; and the update data output device outputs to the navigation apparatus update data of the specified data type over the specified update range.

According to the 16th aspect of the invention, a data update system for a navigation apparatus comprises: a navigation apparatus according to any of the 1st through 8th aspects; and an update data providing apparatus according to any of the 9th through 15th aspects.

According to the 17th aspect of the invention, an update data providing method for providing update data to be used to update first data and update data to be used to update second data of a data type different from the first data to a navigation apparatus that controls road guidance including map display by using the first data and the second data, comprises: specifying at least either the first data or the second data as a type of data to be updated and specifying an update range; outputting update data for the first data over the specified update range in a first update unit to the navigation apparatus if the first data are specified; and outputting to the navigation apparatus the update data for the second data over a range containing the specified update range in a second update unit different from the first update unit if the second data are specified.

According to the 18th aspect of the invention, an update data providing method for providing update data to be used to update first data and update data to be used to update second data of a data type different from the first data to a navigation apparatus that controls road guidance including map display by using the first data and the second data, comprises: displaying a selection screen in which at least either the first data or the second data is selected as a type of data for data update; displaying information indicating a storage state of at least either the first data or the second data at the navigation apparatus; displaying an update range specification screen in which an update range over which at least either the first data or the second data are to be updated is specified; outputting the update data for the first data over the update range having been specified in the update range specification screen to the navigation apparatus in a first update unit if the first data are selected; and outputting the update data for the second data over a range containing the update range having been specified in the update range specification screen to the navigation apparatus in a second update unit different from the first update unit if the second data are selected.

ADVANTAGEOUS EFFECT OF THE INVENTION

The present invention adopting the structure described above achieves the following advantages.

The data update units are adjusted in correspondence to the type of data to be updated. Thus, a data update optimal for the specific data type is enabled. For instance, data related to road connections are updated in units greater than the data update units for data related to map display, and thus, the road connection data can be updated without having to adopt a special data structure to assure data compatibility for data in different areas. Namely, the data can be updated while allowing the data to retain a simple data structure.

BRIEF DESCRIPTION OF THE DRAWINGS

FIG. 2 shows the hierarchical structure adopted in map data;

FIG. 3 shows a map of the entire country of Japan;

FIG. 7 shows the existing data recorded in the hard disk and the additional range specified by the user;

FIG. 8 illustrates how the data may be updated with additional data;

FIG. 11 presents an example of a display screen indicating the telephone number search data recording state in the hard disk, in which the user has specified a range for an update;

FIG. 12 presents an example of a display screen indicating the street address search data recording state in the hard disk, in which the user has specified a range for an update;

FIG. 14 shows how the program may be provided to a personal computer in a recording medium such as a CD-ROM or through a data signal on the Internet or the like.

BEST MODE FOR CARRYING OUT THE INVENTION

Figure 1:
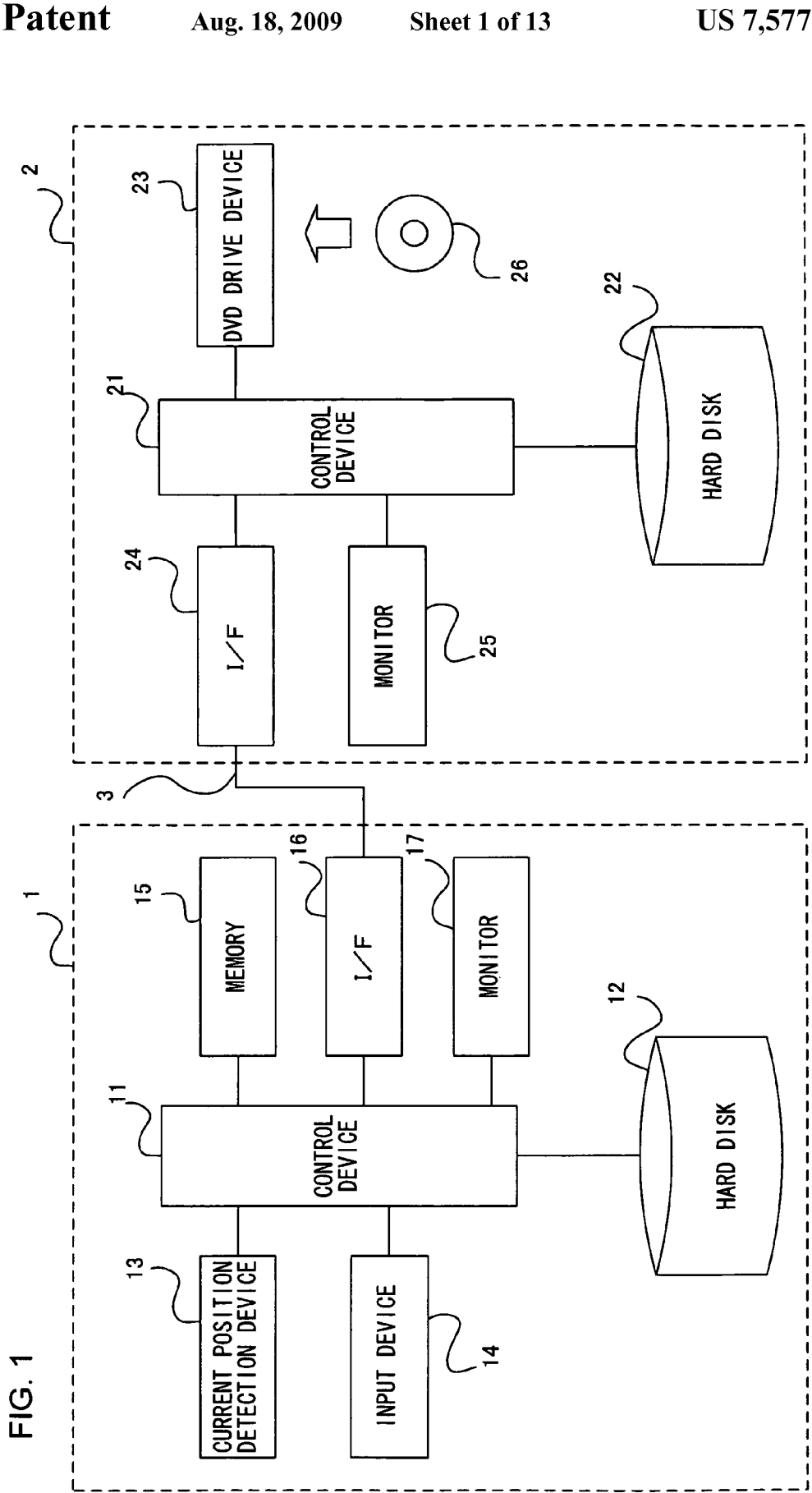
FIG. 1 is a block diagram of the navigation apparatus and the update data providing apparatus achieved in an embodiment of the present invention.

FIG. 1 is a block diagram of the data update system for updating data used in a navigation apparatus, as achieved in an embodiment of the present invention, which includes a navigation apparatus 1 and an update data providing apparatus 2. The navigation apparatus 1 includes a control device 11, a hard disk 12, a current position detection device 13, an input device 14, a memory 15, an interface 16 and a monitor 17. The navigation apparatus 1, which is a car navigation system installed in a vehicle, displays a map and provides road guidance (navigation) such as route guidance by using data for navigation (navigation data) stored in the hard disk 12.

The update data providing apparatus 2, which includes a control device 21, a hard disk 22, a DVD drive device 23, an interface 24 and a monitor 25, may be constituted with a personal computer. The update data providing apparatus 2 in the embodiment is installed at a car dealership to update the navigation data in the navigation apparatus 1 installed in the vehicle at the dealership.

The control device 11 of the navigation apparatus 1, constituted with a microprocessor and its peripheral circuits, executes various types of control for the navigation apparatus 1. In the hard disk 12, navigation data such as map data and search data to be detailed later are stored. The hard disk 12 is a nonvolatile memory that retains data written therein even when the power to the navigation apparatus 1 is turned off. The hard disk 12 may be a nonvolatile memory such as a flash memory that allows a data overwrite.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. Through the input device 14, the destination for the vehicle and the like are entered when conducting a route search. It may be constituted as a remote-control unit or it may be constituted as a touch panel disposed on the screen at the monitor 17.

The memory 15 is used to store the vehicle position information detected with the current position detection device 13 and the like and also to store node information, link information and the like of the nodes and the links on a recommended route calculated by the control device 11. The memory 15 constitutes a working area of the control device 11. The interface 16 enables the navigation apparatus to exchange various types of data with the update data providing apparatus 2 via a cable 3. The monitor 17 is a display device at which a map, a recommended route and various types of information are displayed.

The control device 11 executes various types of navigation processing such as road map display, route search and route guidance by using the current vehicle position information detected with the current position detection device 13, the map data and the search data stored in the hard disk 12 and the like. It is to be noted that a program of the various types of processing executed by the control device 11 is installed in a ROM (not shown) provided inside the control device 11.

The update data providing apparatus 2 is constituted with a personal computer, with the control device 21 thereof constituted with the CPU of the personal computer and its peripheral circuits. The hard disk 22, the DVD drive device 23, the interface 24, the monitor 25 and the like are components constituting the personal computer. In the hard disk 22, the latest version of navigation data to be used in the navigation apparatus 1 is stored. The control device 21 engages the DVD drive device 23 in operation to read the latest navigation data from a DVD 26 having stored therein the latest version of navigation data and stores the navigation data thus read into the hard disk 22. It is to be noted that an older version of navigation data is also stored in the hard disk 22.

—Navigation Data—

The navigation data are now explained in detail. The navigation data stored in the navigation apparatus 1 and the update data providing apparatus 2 include map data and search data.

—Map Data—

The map data are information related to maps and include background (map display) data, road (locator) data, route search (network) data and route guidance data (information indicating intersection names, road names and directional terms, directional guidance facility information and the like). The background data are used to display a background of a road or a background in a road map. The road data are used to specify the current vehicle position for map matching and the like. The route search data, which are data constituted with branching information and the like not directly relevant to the specific road shapes, are mainly used when calculating a recommended route (when executing a route search). The route guidance data include the names of intersections and the like, and are used to provide guidance for the driver or the like along the recommended route having been calculated.

The road data (locator data) are link string data that express roads with links, nodes and link strings. A node may be an intersection or a special point specified on a road. A link is equivalent to a road connecting nodes, whereas a link string is a string of a plurality of links representing a single road. The details of the link string data are of the known art. The background data may be, for instance, polygon or polyline data. Roads are displayed by using polyline data or the like.

The map data are managed in the embodiment based upon a concept that they are provided in blocks and meshes at different levels. In the embodiment, the map data are divided into seven different levels of data, with each level corresponding to a specific scaling factor. Level 0 corresponds to the scaling factor at which the map is provided with the most detail, and at level 6, the map is provided as the widest-area map. While the different levels of map data are provided at varying scaling factors, a common area is covered by the various levels of map data. Namely, supposing that the subject area is the entire nation of Japan, map data of the entire nation of Japan are provided at each level with a scaling factor different from the scaling factors corresponding to the other levels. For instance, the scaling factor of the level 0 data is 1/6,250, the scaling factor of the level 3 data is 1/400,000 the scaling factor of the level 4 data is 1/1,600,000 and the scaling factor of the level 6 data is 1/12,800,000

FIG. 2 illustrates the hierarchical structure of the map data. It shows the seven hierarchical levels 0 through 6. A specific type of data may be available at all the levels and another specific type of data may be available only at some levels in the embodiment. The background (map display) data are available at levels 0 through 6, the locator data are available at level 1 and the route search data are available at levels 1, 2, 4 and 5. The route guidance data are available only at level 1. The map is divided into a specific number of portions at each level, the smallest unit portions into which the map is divided at a given level are referred to as meshes inherent to the level and a range containing a plurality of meshes is referred to as a block.

The terms used in the tables corresponding to the individual levels of data in FIGS. 2(*a*) through 2(*g*) are now explained. The term "block management unit" indicates the range managed as a single block at each level, and the unit corresponding to one block at level 6 in FIG. 2(*a*) contains 1600 primary meshes to be detailed later. The term "mesh management unit" indicates the range managed as a single mesh in the block divided into a plurality of meshes. At level 6, the block contains only one mesh and accordingly, the management unit corresponding to a single mesh is 1600 primary meshes. In other words, the mesh management unit and the block management unit are equal to each other at level 6.

The term "mesh management number" refers to the number of meshes contained in a single block. The mesh management number is 1 at level 6. The term "block management number" refers to the total number of blocks into which the data are divided at the particular level. The map data in the embodiment represent a map of Japan and the entire map of Japan in FIG. 3 is represented by a single block at level 6. Accordingly, the block management number is 1 at level 6.

Let us now consider the data at level 5 in FIG. 2(*b*). At level 5, the data in the single mesh at level 6 are divided into 25 portions and the data are thus managed as 25 meshes. Namely, the mesh management unit at level 5 is 64 primary meshes, i.e., 1/25 of the 1600 primary meshes. There is only one block of data containing 25 meshes representing the entire country of Japan. In other words, while there is only one block of level 5 data, as in the case of level 6 data, the block at level 5 contains 25 meshes, unlike the level 6 block containing a single mesh.

The concept described above is explained in further detail in reference to FIG. 3. FIG. 3 presents a map of the entire country of Japan. In the embodiment, the data are provided in a range over long. 120° E through long. 160° E along the east/west direction and over lat. 22° 40" N through lat. 49° 20" N along the south/north direction, as shown in FIG. 3. The single block of level 6 data ranges over long. 120° E through long. 160° E and over lat. 22° 40" N through lat. 49° 20" N and the single mesh of the level 6 data also covers the same range. At level 5, this range is divided into 25 portions, and each of the 25 portions constitutes a single mesh. The 25 meshes constitute a block ranging over long. 120° E through long. 160° E and over lat. 22° 40" N through lat. 49° 20" N.

FIG. 3 also shows the level 3 data. As indicated in FIG. 3, the range indicated by reference numeral 101, one of the 25 portions obtained by dividing the entire country of Japan, is further divided into 64 portions. The term "primary mesh" mentioned earlier is used to refer to each of the 64 portions in the embodiment. Reference numeral 102 indicates one of the primary meshes. At level 3, the primary mesh is further divided into four portions each representing a level 3 mesh management unit. Namely, a quarter primary mesh constitutes a mesh at level 3 and a set of 256 level 3 meshes (64 primary meshes) is assigned as the block management unit at level 3.

Nine such blocks are required to represent the entire land mass of Japan, as shown in FIG. 3. These blocks are assigned with sequential block numbers up to 9, starting with block 1 indicated by reference numeral 101. No data are provided in correspondence to the ocean areas, since there is no need for such data. To summarize, the mesh management unit at level 3 is a quarter primary mesh, each block contains 256 meshes and the data for the entire land mass of Japan are stored in nine such blocks. The level 2 through level 0 data are organized based upon a similar principle.

It is to be noted that while the range covered in a single mesh changes from one level to another, the primary meshes mentioned earlier retain a fixed size univocally determined at all levels. In addition, the terms "secondary mesh", "2.5th-order mesh" and "3.5th-order mesh" corresponding to the data at levels 0 through 2 in FIG. 2 are respectively used to 1/64 of a primary mesh, 1/16 of a secondary mesh (1/1024 of a primary mesh) and 1/16 of a 2.5th-order mesh (1/16,384 of a primary mesh), each retaining a size determined irrespective of the data levels.

Data files for various types of data are generated in units of individual blocks at each level in the embodiment. For instance, there are 576 blocks at level 1, and accordingly, there are 576 background data files, 576 road data files, 576 route search data files and 576 route guidance data files at level 1. While there are 9,216 blocks at level 0, only background data are provided at level 0 and accordingly, the level 0 data only include 9,216 background data files. Each data file contains all-mesh management information used to manage the data in all the meshes present in the corresponding block.

File name assignment to the data files is now explained. In the embodiment, the file name for a map data file is determined based upon latitudinal/longitudinal values. For instance, the file name assigned to a given block may be abcdefgh.DAT. DAT is an extension element indicating that the file contains data such as map data. The file name is assigned by adopting a method similar to the method with which primary mesh codes are calculated.

$ab$=(latitude at block lower end)×1.5

$cd$=(longitude at block left end)−100

$ef$=(latitude at block upper end)×1.5

$cd$=(longitude at block right end)−100

Thus, the range of the area can be ascertained simply based upon the file name. Accordingly, once the file name management information stored at the hard disk 12 is obtained, the specific areas for which data are stored in the hard disk 12 can be ascertained. It is to be noted that each set of data is managed by organizing the data on a hierarchical basis in a folder (directory). They may be managed in hierarchical layers, route/data type/level/file name, for instance. The data may also be organized in a hierarchical structure other than this.

—Search data—

The search data include category name search data, telephone number search data and street address search data. The category name search data are used to identify a specific position on the map in correspondence to the name of a facility present thereat, and data files for each category are created each in correspondence to one of the prefectures. The categories include, for instance, "stations", "airports", "ferries", "department stores" and "hotels". Each file contains search tree data and facility name substance data.

The telephone number search data are used to locate a position on the map based upon the telephone number, and data files are prepared each in correspondence to numerals in the first two digits of an area code. Each file contains search tree data and telephone number substance data. The street address search data are used to locate a position on the map in correspondence to the street address, and data files are prepared each in correspondence to a local municipality in a prefecture. Each file contains search tree data and street address substance data.

—Updating Navigation Data—

Figure 4:
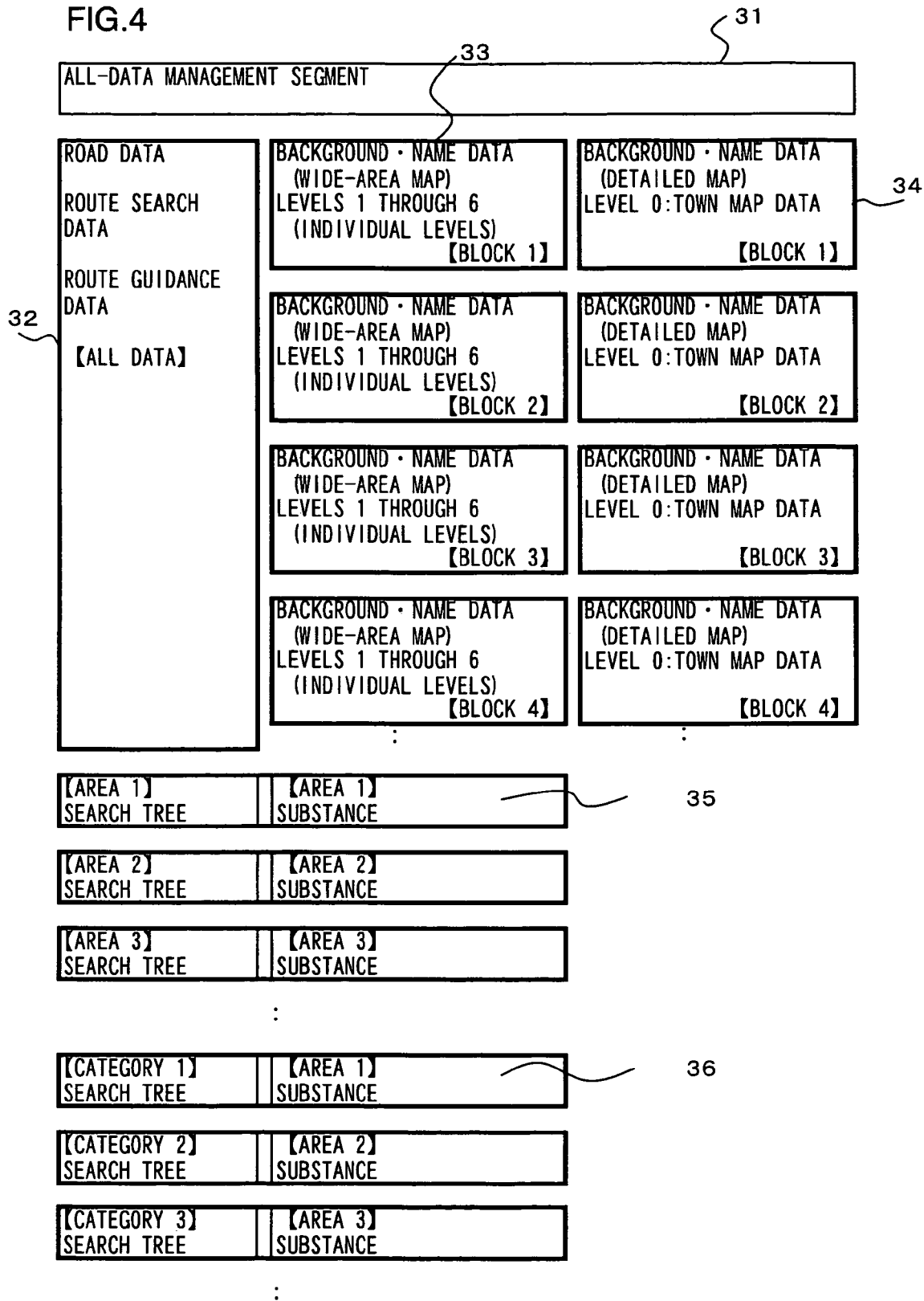
FIG. 4 shows navigation data stored in the hard disk of the navigation apparatus, from the viewpoint of updates thereof.

Next, an explanation is given on how the navigation data stored at the navigation apparatus 1 are updated. FIG. 4 shows the navigation data in the embodiment which are stored in the hard disk 12 of the navigation apparatus 1, presented from the viewpoint of the update thereof. An all-data management segment 31 contains file management information such as the file names and the histories of the individual data files. While the all-data management segment 31 is stored as a data file in the hard disk 12, its contents are also opened in the memory 15.

Data 32 indicate that the road data, the route search data and the route guidance data are all updated in their entirety. In other words, when the road data, for instance, are selected as the data to undergo an update and a specific area is specified as the update range, the entire road data corresponding to all the areas, stored in the hard disk 12 are updated. In addition, the road data are updated at all the applicable levels. This means that even if of the road data, route search data or route guidance data over a limited area is specified for an update, the entire data in the specified data type stored in the hard disk 12 are updated.

Data 33 indicate that the background data at levels 1 through 6 are updated in units of blocks. Namely, assuming that the background data for a wide-area map (at a specific level among levels 1 through 6) are selected for an update and a given area is specified as the update range, the background data in the blocks corresponding to the specified area at levels 1 through 6 are updated. In other words, the background data are updated in units of blocks at the individual levels.

Data 34 indicate that the background data at level 0 are updated in units of blocks. Namely, if the background data for the detailed map (level 0) are selected for an update and a specific area is specified as the update range, the background data in the block corresponding to the specified area at level 0 are updated. In other words, the background data are updated in units of individual blocks at level 0. It is to be noted that the update of the background data at level 0 is managed separately from the update of the background data at levels 1 through 6, since the data volume of the background data at level 0 is very large.

Data 35 indicate that the telephone number search data and the street address search data are both updated in units of specific areas. Since the telephone number search data are created in units of areas each assigned with specific numerals for the first two digits of the area code, the telephone number search data are updated in units of the individual areas each corresponding to the specific combination of numerals for the first two digits of the area code. The street address search data files are created in units of individual municipalities in various prefectures and, accordingly, the street address search data are updated in units of individual local municipalities. Data 36 indicate that the category name search data are updated in units of specific areas in correspondence to each category.

As described above, the road data, the route search data and the route guidance data are all updated in their entirety, whereas the background data and the search data are updated in units of predetermined areas. The reason for updating different types of data over different ranges is as follows. Namely, the road data, route search data, route guidance data and the like are related to road connections and are mainly constituted with network information. If data related to road connections are to be updated over a limited area, it will become necessary to work out a data structure that allows coordination of the data in the area in relation to the connections with the roads in other areas. The overhead of the data utilization is bound to become significant as data, adopting a structure designed to allow coordination of the data in the update area in relation to the connections with the roads in other areas, are updated repeatedly.

Accordingly, whenever the road data, the route search data or the route guidance data need to be updated, the particular type of data stored in the hard disk 12 is updated in their entirety according to the present invention. This eliminates the need to specially coordinate the data in different areas and thus, the data assuming a simple data structure can be updated. This, in turn, facilitates development of control programs for the navigation apparatus, the data volumes of the road data, the route search data and the route guidance data can be minimized and the speed of the processing executed by using these data can be improved.

In the case of data other than road data, route search data and route guidance data, i.e., background data related to map display and search data related to a search, it is not as crucial to maintain data coordination among different areas. Accordingly, it is more cost-effective for the user to update these data over a desired area.

—Flow of Navigation Data Update—

Figure 5:
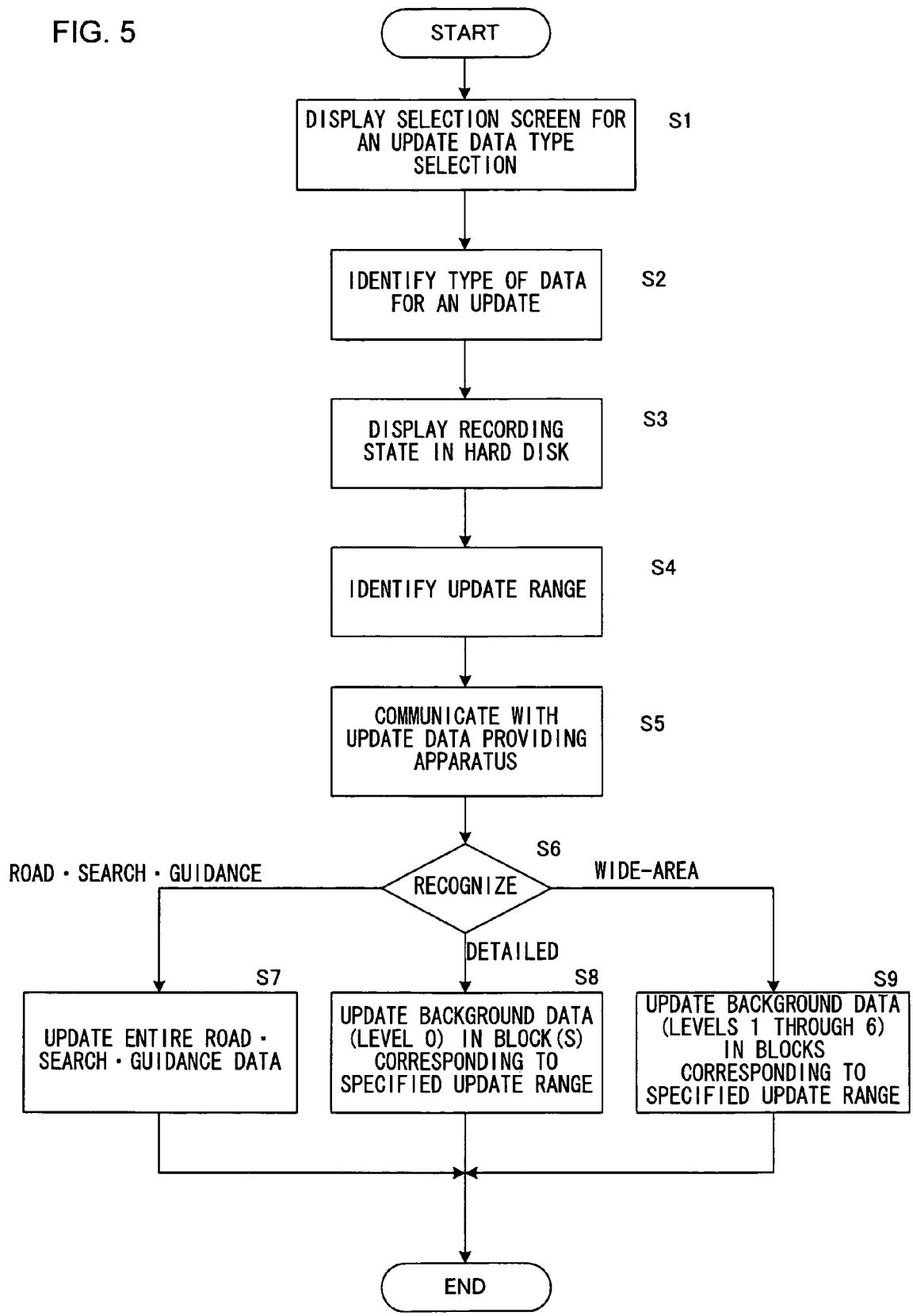
FIG. 5 presents a flowchart of a control program executed in the navigation apparatus to update map data.

FIG. 5 presents a flowchart of a control program executed by the navigation apparatus 1 to update map data constituting part of the navigation data. The control program is executed by the control device 11. The processing in FIG. 5 starts as a menu "map data update" is selected in a menu screen or the like at the navigation apparatus 1.

In step S1, a selection screen in which a type of data to be updated is selected is brought up on display at the monitor 17. Then, the operation waits for the user to select the type of data to be updated via the input device 14. Options such as "road data", "route search data", "route guidance data", "detailed map" and "wide-area map" are displayed in the data type selection screen so as to allow the user to select a specific type of data. By selecting "detailed map", the user is specifying the background data at level 0 for an update, whereas by selecting "wide-area map" the user is specifying the background data at levels 1 through 6 for an update. The background data include name data indicating the names used in the map display.

In step S2, a specific data type is recognized (selected) based upon the selection operation having been performed by the user. In step S3, the recording state in the hard disk 12 with regard to the particular type of data having been specified is displayed. More specifically, the range of the data stored in the hard disk 12 is indicated in a display that allows the user to visually ascertain the data range in terms of areas on the map. In addition, in order to allow the user to correlate the various blocks on the map to the individual data files, grid lines (borders) are displayed to define the individual blocks. The user is able to specify an area for an update via the input device 14 in this state. The user may specify an area corresponding to a single block or he may specify a range covering a plurality of blocks.

In step S4, the update range having been specified by the user is identified. In step S5, the file management information in the all-data management segment 31 and information indicating the selected data type and the specified update range are transmitted to the update data providing apparatus via the interface 16 and the corresponding update data are received from the update data providing apparatus. In step S6, the selected data type is recognized. If "road data", "route search data" or "route guidance data" has been selected, the operation proceeds to step S7. The operation proceeds to step S8 if "detailed map" has been selected, and the operation proceeds to step S9 if "wide-area map" has been selected.

In step S7, the entire data in the selected data type, i.e., "road data", "route search data" or "route guidance data" are updated. In this case, the update data corresponding to the entire data stored at the hard disk 12 instead of just the update data over the specified update range will have been received from the update data providing apparatus 2 in step S5.

In step S8, the background data at level 0 are updated in units of blocks. In this case, the update data in the block(s) corresponding to the specified update range will have been received from the update data providing apparatus 2 in step S5. In step S9, the background data at levels 1 through 6 are updated in units of blocks. In this case, the update data over the blocks at the various levels corresponding to the specified update range will have been received from the update data providing apparatus 2 in step S5. It is to be noted that if the update range has been specified by specifying a block at a lower-order level (e.g., level 1), the data at higher-order levels are updated in units of higher-order level blocks containing the area corresponding to the specified lower-order level block.

It is to be noted that since update data are transmitted as data files each corresponding to a block, the existing file data can simply be overwritten with data in the files bearing the same file names and a new file only needs to be written into the hard disk 12 as an additional file through file management executed in personal computers and the like. At this time, the file management information in the all-data management segment 31, too, is updated as necessary.

Figure 6:
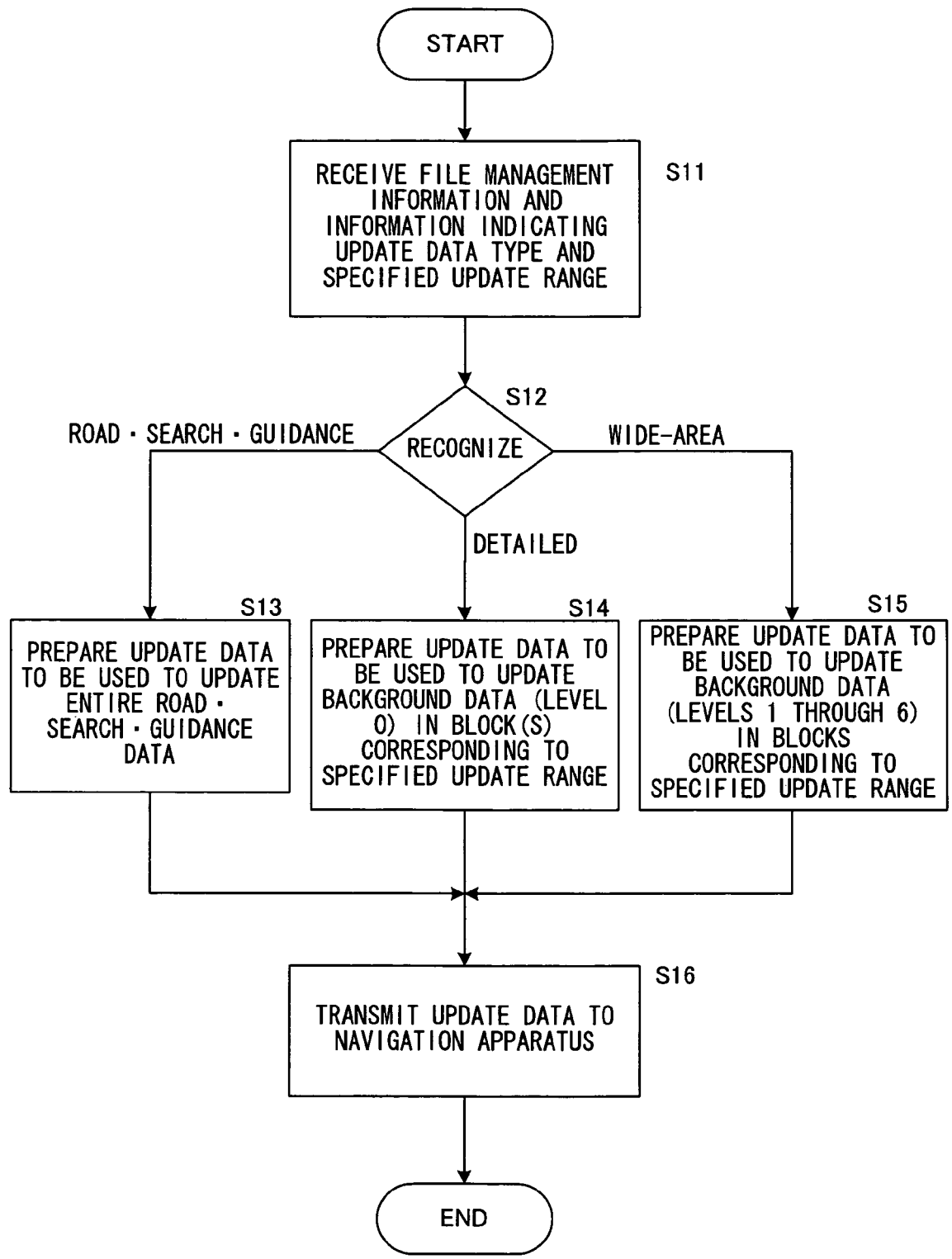
FIG. 6 presents a flowchart of a control program executed in the update data providing apparatus to prepare update data for navigation data and transmit the prepared update data to the navigation apparatus.

FIG. 6 presents a flowchart of a control program executed in the update data providing apparatus 2 to prepare update data to be used to update navigation data and transmit the prepared update data to the navigation apparatus 1. The control program is executed by the control device 21. The processing in FIG. 6 starts as a startup instruction for starting up the control program is issued at the update data providing apparatus 2.

In step S11, the file management information, the information indicating the type of data to be updated and the specified update range, transmitted from the navigation apparatus 1 are received. In step S12, the data type indicated in the received information is recognized. If the data type is "road data", "route search data" or "route guidance data", the operation proceeds to step S13. If "detailed map" is indicated, the operation proceeds to step S14, whereas if "wide-area map" is indicated, the operation proceeds to step S15.

In step S13, update data in the specified data type, i.e., "road data", "route search data" or "route guidance data" are prepared. Based upon the file management information having been received, the entire range of the data corresponding to the data type stored in the navigation apparatus 1 is ascertained and update data to be used to update the entire data, the range of which is thus ascertained, are prepared. The update data are prepared by reading out files corresponding to the relevant blocks from the latest data stored in the hard disk 22.

In step S14, update data to be used to update the background data at level 0 over the specified update range are prepared. The update data are prepared by reading out files corresponding to the relevant block(s) from the latest data stored in the hard disk 22. In step S15, update data to be used to update the background data at levels 1 through 6 over the specified update range are prepared. The update data are likewise prepared by reading out files corresponding to relevant blocks from the latest data stored in the hard disk 22. In step S16, the update data having been prepared are transmitted to the navigation apparatus 1, before the processing ends.

A data update executed by adding new data to the existing data is now explained in reference to FIGS. 7 and 8. FIG. 7 shows the display brought up in step S3 in FIG. 5, which indicates the recording state of the existing data in the hard disk 12 and an additional range specified by the user. An area 42 is equivalent to the range of the data already recorded in the hard disk 12. An area 43 is a range specified by the user, over which he wishes to add new data for an update. The area 43 partially overlaps the area 42.

FIG. 8 illustrates the method adopted to update data by adding new data. FIG. 8(a) illustrates the update method adopted in conjunction with the background data. The data in the part of the area 42 that does not overlap the specified update area 43 are not updated. However, update data are prepared to replace the data in the part of the area 42 that overlaps the specified update area 43. In addition, new additional data are prepared for the part of the update specified area 43 that does not overlap the area 42. It is to be noted that the update data and the additional data are prepared in units of blocks at the individual levels, as explained earlier.

FIG. 8(b) illustrates the update method adopted in conjunction with the road data, the route search data and the route guidance data. The latest data are prepared for an area that includes the existing area 42 and the specified update area 43 to be used for the update. In other words, the old data in the area 42 are deleted and new data for the area that combines the area 42 and the area 43 are added.

As described above, if more data need to be added to the road data, the route search data or the route guidance data, the latest data are added and the data stored in the hard disk 12 are also updated with the latest data. As a result, data can be added while retaining the simple data structure, without having to work out data coordination in different areas. This, in turn, facilitates development of control programs for the navigation apparatus, the data volumes of the road data, the route search data and the route guidance data can be minimized and the speed of the processing executed by using these data can be improved, as in the case of a data update.

Figure 9:
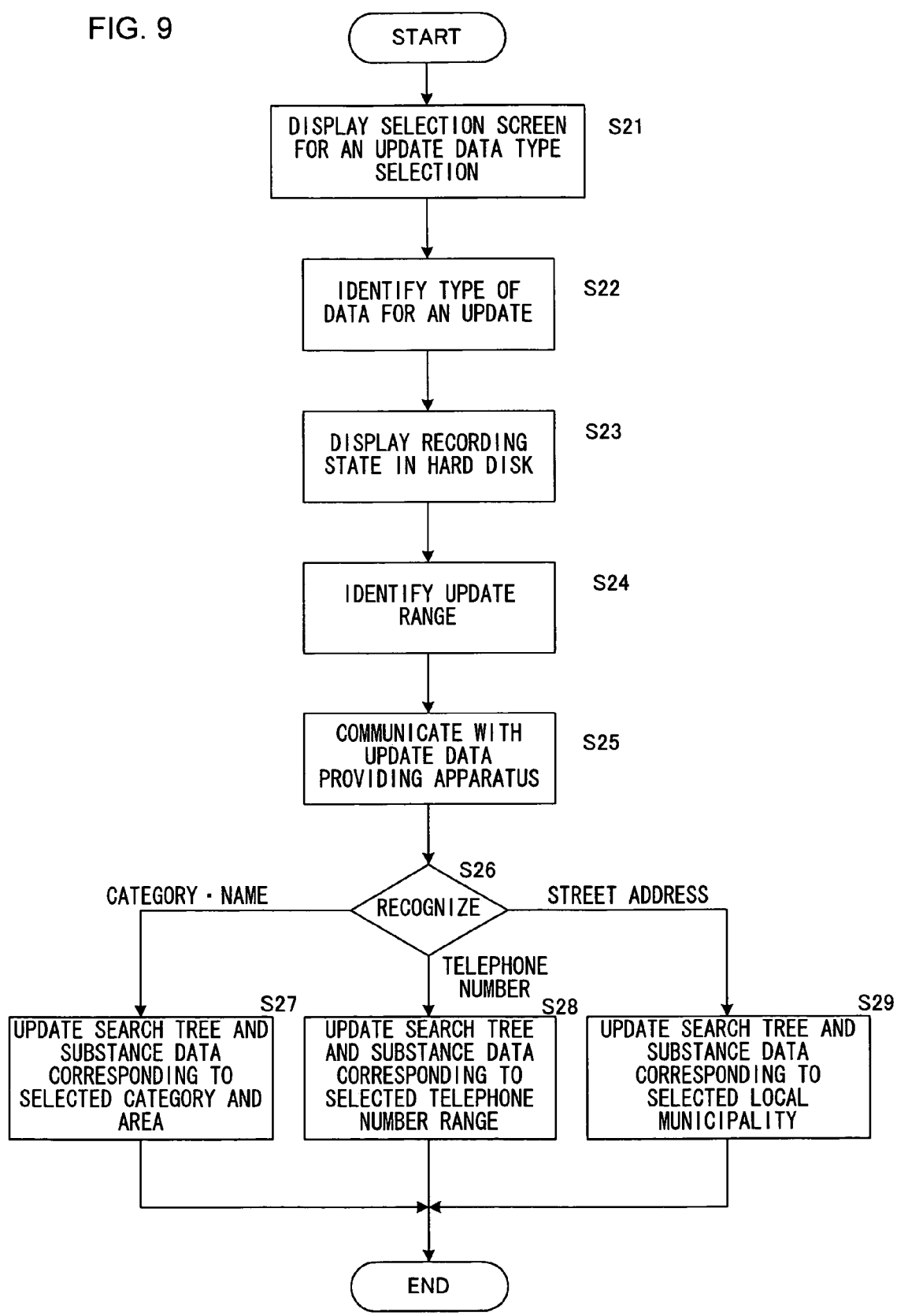
FIG. 9 presents a flowchart of a control program executed in the navigation apparatus to update search data.

Next, an update of the search data is explained. FIG. 9 presents a flowchart of a control program executed in the navigation apparatus 1 to update search data constituting part of the navigation data. The control program is executed by the control device 11. The processing in FIG. 9 starts as a menu "search data update" is selected in a menu screen or the like at the navigation apparatus 1.

In step S21, a selection screen in which a type of data to be updated is selected is brought up on display at the monitor 17. Then, the operation waits for the user to select the type of data to be updated via the input device 14. Options such as "category name search data", "telephone number search data" and "street address map" are displayed in the data type selection screen so as to allow the user to select a specific type of data. In step S22, a specific data type is recognized (selected) based upon the selection operation having been performed by the user. In step S23, the recording state of the data in the hard disk 12 with regard to the data type having been specified is displayed. The user is able to specify a range for an update via the input device 14 in this state.

Figure 10:
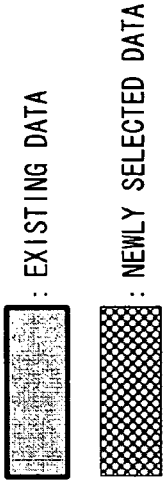
FIG. 10 presents an example of a display screen indicating the category name search data recording state in the hard disk, in which the user has specified a range for an update.

FIG. 10 presents an example of a display screen indicating the recording state of the category name search data in the hard disk 12 and the update range specified by the user. FIG. 10 indicates that data for "Ibaragi Prefecture", "Tochigi Prefecture" and the like are already recorded in the category "department stores" and that the user has selected data for "Nagano Prefecture", "Gifu Prefecture" and the like to be newly added.

FIG. 11 presents an example of a display screen indicating the recording state of the telephone number search data in the hard disk 12 and the update range specified by the user. FIG. 11 indicates that data corresponding to "03" and "04" for the first two digits of area codes are already recorded and that the user has selected data corresponding to "05" to be newly added.

FIG. 12 presents an example of a display screen indicating the recording state of the street address search data in the hard disk 12 and the update range specified by the user. FIG. 12 indicates that data corresponding to municipalities such as "Atsugi City" and "Sagamihara City" in "Kanagawa Prefecture" are already recorded and that the user has selected data for "Aikawa Town" and "Samukawa Town" to be newly added.

In step S24, the update range having been specified by the user is identified. In step S25, the file management information, information indicating the selected data type and the specified update range are transmitted to the update data providing apparatus via the interface 16 and the corresponding update data are received from the update data providing apparatus. In step S26, the selected data type is recognized. If the data type "category name search data" has been selected, the operation proceeds to step S27. If the data type "telephone number search data" has been selected, the operation proceeds to step S28, whereas if the data type "street address search data" has been selected, the operation proceeds to step S29.

In step S27, the category name search data in the selected category are updated in units of individual prefectures. The category name search data are prepared as data files each corresponding to a specific prefecture in each category. In step S28, the telephone number search data are updated in units of individual numeral pairs each containing the first two digits of an area code. The telephone number search data are prepared as data files each corresponding to a pair of specific numerals representing the first two digits of an area code. In step S29, the street address search data are updated in units of local municipalities in each prefecture. The street address search data are prepared as data files each corresponding to a specific local municipality in a given prefecture.

(Variation)

Figure 13:
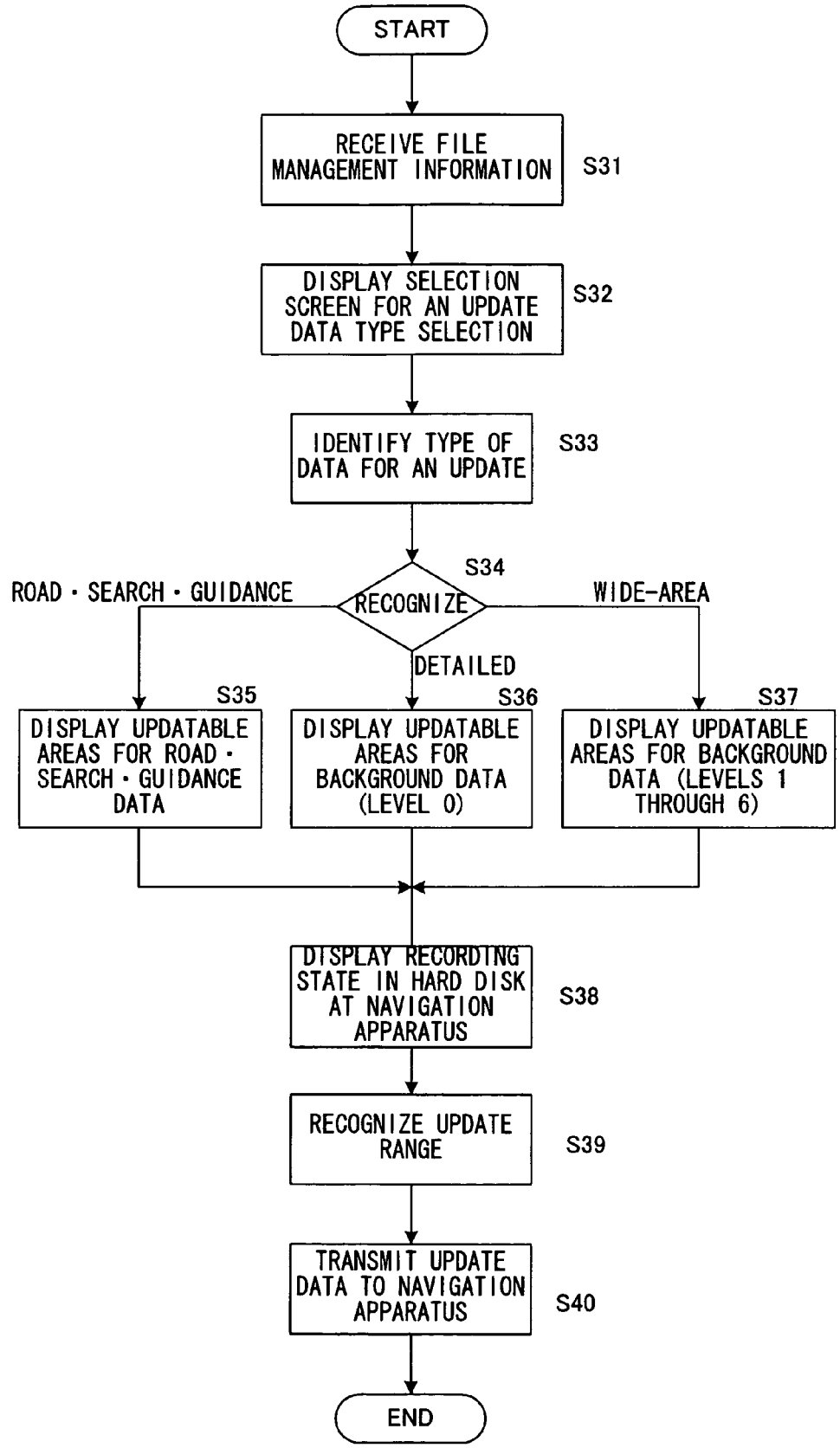
FIG. 13 presents a flowchart of a control program executed in the update data providing apparatus to have a specific data type selected and the update range specified, prepare update data and transmit the update data to the navigation apparatus.

While the type of data to be updated is selected and the update range is specified at the navigation apparatus in the embodiment described above, the data type may be selected and the update range may be specified at the update data providing apparatus 2, instead. FIG. 13 presents a flowchart of a control program executed in the update data providing apparatus 2 to have a specific data type selected and the update range specified, prepare update data and transmit the update data to the navigation apparatus 1. The control device 21 at the update data providing apparatus 2 executes the control program. The processing in FIG. 13 starts as a startup instruction for starting up the control program is issued at the update data providing apparatus 2.

In step S31, a request for file management information transmission is issued to the navigation apparatus 1 and the file management information is received. In step S32, a selection screen in which the type of data to be updated is selected is brought up on display at the monitor 25. Subsequently, the operation waits for the personnel at the dealership (or the user) to select the type of data to be updated via the keyboard (not shown) or the mouse (not shown) at the update data providing apparatus 2. Options such as "road data", "route search data", "route guidance data", "detailed map" and "wide-area map" are displayed in the data type selection screen so as to allow the dealership personnel to select a specific type of data. By selecting "detailed map", the dealership personnel is specifying the background data at level 0 for an update, whereas by selecting "wide-area map" the dealership personnel is specifying the background data at levels 1 through 6 for an update, as explained earlier.

In step S33, a specific data type is recognized (selected) based upon the selection operation having been performed by the dealership personnel. In step S34, the selected data type is recognized. If "road data", "route search data" or "route guidance data" has been selected, the operation proceeds to step S35. The operation proceeds to step S36 if "detailed map" has been selected, and the operation proceeds to step S37 if "wide-area map" has been selected.

In step S35, the updatable areas for the data in the selected data type, i.e., "road data", "route search data" or "route guidance data" are displayed. In step S36, the updatable areas for the background data at level 0 are displayed. In step S37, the updatable areas for the background data at levels 1 through 6 are displayed. The term "updatable area" refers to an area in correspondence to which the latest version of update data is stored in the hard disk 22. Over certain areas, such as a mountainous area, update data for some data types may not be available. The updatable areas are indicated in a map display by using grid lines or the like so as to allow updatable blocks corresponding to the available data files to be visually recognized.

In step S38, the data in the specified data type recorded in the hard disk 12 of the navigation apparatus 1 are overwritten on the display brought up in step S35, S36 or S37. The recording state in the hard disk 12 of the navigation apparatus 1 can be ascertained based upon the file management information having been received in step S31. The dealership personnel are able to specify the update area in this state by using the keyboard or the mouse. As explained earlier, an area corresponding to a single block may be specified or a range covering a plurality of blocks may be specified.

In step S39, the update range specified by the dealership personnel is identified. In step S40, update data are prepared by reading out files corresponding to the target block(s) from the latest data stored in the hard disk 22 based upon the selected data type and the specified update range and the update data thus prepared are transmitted to the navigation apparatus 1. If the selected data type is "road data", "route search data" or "route guidance data", update data to be used to update the entire data in the selected data type stored in the navigation apparatus 1 are prepared based upon the file management information having been received. Update data to be used to update the background data at level 0 over the specified update range are prepared in units of blocks. Update data to be used to update the background data at levels 1 through 6 over the specified update range are prepared in units of blocks at the individual levels.

The navigation apparatus 1 transmits the file management information in the all-data management segment 31 in response to the transmission request transmitted from the update data providing apparatus 2 and updates data as necessary by using update data transmitted from the update data providing apparatus 2. Thus, simply by taking the vehicle to the dealership and operating the update data providing apparatus 2 installed at the dealership, the navigation data in the navigation apparatus 1 can be updated.

The use of the navigation apparatus 1 and the update data providing apparatus 2 described above achieves the following advantages.

(1) Different types of data are updated in different update units, and thus, the optimal data update is enabled for each type of data. For instance, data related to road connections, such as "road data", "route search data" and "route guidance data" are all updated by updating the entire data stored in the hard disk 12, whereas data related to map display such as "background data" are updated in units of specific blocks. Namely, the update units for the data related to road connections are set greater than the update units for the data related to map display. In other words, a type of data, a partial update of which is bound to affect the entire data, is updated in their entirety or in a batch over a significantly wide range (over a range greater than the unit range over which other types of data are updated). As a result, highly efficient navigation data update is assured.

(2) It is crucial that updated data related to road connections be coordinated with road connection data in other areas. Accordingly, the types of data related to road connections are all updated by updating the entire stored data. This eliminates the need for the data to adopt a special structure (data structure) that will assure data coordination among different areas. In other words, the data can be updated while retaining a simple data structure. This, in turn, facilitates development of control programs for the navigation apparatus, the data volumes of the road data, the route search data and the route guidance data can be minimized and the speed of the processing executed by using these data can be improved.

(3) It is not a matter of crucial importance that the search data over different areas be rigorously coordinated, for the same reason as that having been explained in reference to the map display data. Accordingly, the search data, too, can be updated in update units set smaller than the update units for the data related to road connections. Since this allows the search data to be updated over a specific range as needed, a cost-efficient update is enabled.

(4) When adding new data, too, the data related to road connections are updated as a whole that includes the additional data, thereby eliminating the need for the data to adopt a special structure (data structure), to assure data coordination among different areas. In other words, data can be added for an update while retaining a simple structure.

(5) During the update operation, the existing data stored in the hard disk 12 are indicated on display and thus, the user is able to specify the update range with ease. The display of the information indicating the range of the existing data also facilitates the update operation. In particular, since the map data are indicated in a map format to facilitate visual recognition, the current recording state in the hard disk 12 can be ascertained readily.

(6) Since the updatable areas for each type of data are indicated, the update range can be specified with ease.

(7) By adopting a structure in which information related to a data update is entered exclusively at the update data providing apparatus 2, the update operation can be further facilitated. While the operability of the input device at the navigation apparatus 1 is somewhat diminished, the alternative structure allows the information can be entered at the update data providing apparatus 2 constituted with a personal computer or the like via a keyboard or a mouse to afford superior ease of operation.

(8) Since update data are provided in correspondence to the user specified range, data that the user considers to be necessary can be obtained with precision.

(9) Data can be updated by using the update data providing apparatus 2 installed at the dealership, eliminating the need for each user to obtain an update data providing apparatus 2. In addition, it is not necessary to install at the navigation apparatus 1 a device for reading DVDs or CD-ROMs for purposes of data update. Furthermore, data do not need to be updated via the Internet or the like by using a portable telephone or the like, and thus, it is not strictly necessary for the navigation apparatus 1 to include a connecting means for connecting with the Internet. Since data are exchanged through a direct wired connection, the data update can be executed speedily.

(10) Since the data related to map display can be updated in units of blocks, i.e., in specific units, the map display data can be updated over a specific range in which the data need to be updated. As a result, the cost of data update is lowered and the length of time required for the data update is reduced.

(11) Since data can be updated in units of files, the update management is simplified. In addition, since the data file corresponding to a given area at a given level retains the same file name, the data in the area can be updated simply by overwriting them with the new file. New data can be added simply by adding a new file.

(12) The data file names are each assigned based upon the latitudinal/longitudinal values, in a format that indicates the ranges of the individual areas clearly. Thus, the ranges of data stored in the hard disk can be ascertained simply by checking the file name management information.

It is to be noted that while an explanation is given above in reference to the embodiment on an example in which the data related to road connections are updated by updating the entire data stored in the hard disk 12, the present invention is not limited to this example and the data may instead be updated in units of limited ranges. However, such ranges should represent units greater than the background data update units. For instance, the road connection data over the entire country stored in the hard disk may be updated in units each corresponding to a specific region such as the Kanto region or the Kansai region. It goes without saying that the background data can be updated in units smaller than such regional units.

While the updatable areas are displayed at the update data providing apparatus 2 in the variation of the embodiment described above, the present invention is not limited to this example and the updatable areas may instead be displayed at the navigation apparatus 1. In the latter case, the navigation apparatus 1 needs to be provided with information indicating the updatable areas by the update data providing apparatus 2.

While an explanation is given above in reference to the embodiment on an example in which the update data providing apparatus 2 is constituted with a personal computer, the present invention is not limited to this example and the update data providing apparatus 2 may be constituted with a workstation or another type of large-scale computer system.

While an explanation is given above in reference to the embodiment on an example in which the navigation apparatus 1 and the update data providing apparatus 2 are connected with each other through a cable (wired connection), the present invention is not limited to this example and they may be wirelessly connected. While it is desirable to connect the navigation apparatus 1 and the update data providing apparatus 2 without an intermediary such as the Internet, the present invention does not exclude a structure in which update data are provided via the Internet.

While an explanation is given above in reference to the embodiment on an example in which the update data providing apparatus 2 is installed at the dealership, the present invention is not limited to this example and the update data providing apparatus may be installed at another facility such as a vehicle manufacturer's service department, a gas station or a convenience store. As an alternative, a hotspot where the navigation data can be obtained may be established. In addition, the update data providing apparatus 2 may be made available as a rental unit. Furthermore, the update data providing apparatus 2 may be constituted by utilizing a personal computer owned by the user. In such a case, a recording medium such as a DVD having the update control program and the latest version of map data, may be rented or the like to the user.

While an explanation is given above in reference to the embodiment on an example in which the navigation apparatus 1 does not include a drive device for driving CD-ROMs or DVDs, the present invention is not limited to this example and the navigation apparatus may include a CD-ROM or DVD drive device. In such a case, the update data may be taken in from, for instance, a DVD via the DVD drive device to be stored into a non-volatile memory such as an internal hard disk. The user of such a navigation apparatus purchases or rents a DVD having stored therein only the latest version of background data and the like in units of blocks only over the minimum areas in correspondence to which the data need to be updated and also having stored therein the latest version of the road connection data in units greater than the blocks or over the range corresponding to the entire road connection data stored in the nonvolatile memory. Alternatively, the update data may be provided in an IC card or the like.

While an explanation is given above in reference to the embodiment on an example in which the present invention is adopted in conjunction with a navigation apparatus installed in a vehicle, the present invention is not limited to this example and may also be adopted in a portable navigation apparatus.

While an explanation is given above in reference to the embodiment on an example in which the programs executed in the navigation apparatus 1 and the update data providing apparatus 2 are preinstalled in the individual apparatuses, the present invention is not limited to this example. For instance, the programs may be provided in recording media such as DVDs, CD-ROMs, or flash memory. In such a case, the navigation apparatus and the update data providing apparatus will each need to include a device capable of reading data from a recording medium. Alternatively, the programs may be provided via a transmission medium such as a communication line, a typical example of which is the Internet. In other words, the programs converted to signals on carrier waves on which transmission media are carried, may be provided through transmission. Furthermore, the navigation apparatus 1 in the data update system shown in FIG. 1 may be provided with the necessary program by the update data providing apparatus 2.

While an explanation is given above in reference to the embodiment on an example in which the present invention is adopted in a dedicated navigation apparatus exclusively used in a vehicle, the present invention is not limited to this example and the control program for the navigation apparatus 1 described earlier may be executed on a personal computer to enable the personal computer to function as a navigation apparatus. Under such circumstances, the current position detection device 13 and the like should be connected to specific I/O ports or the like of the personal computer.

Figure 14:
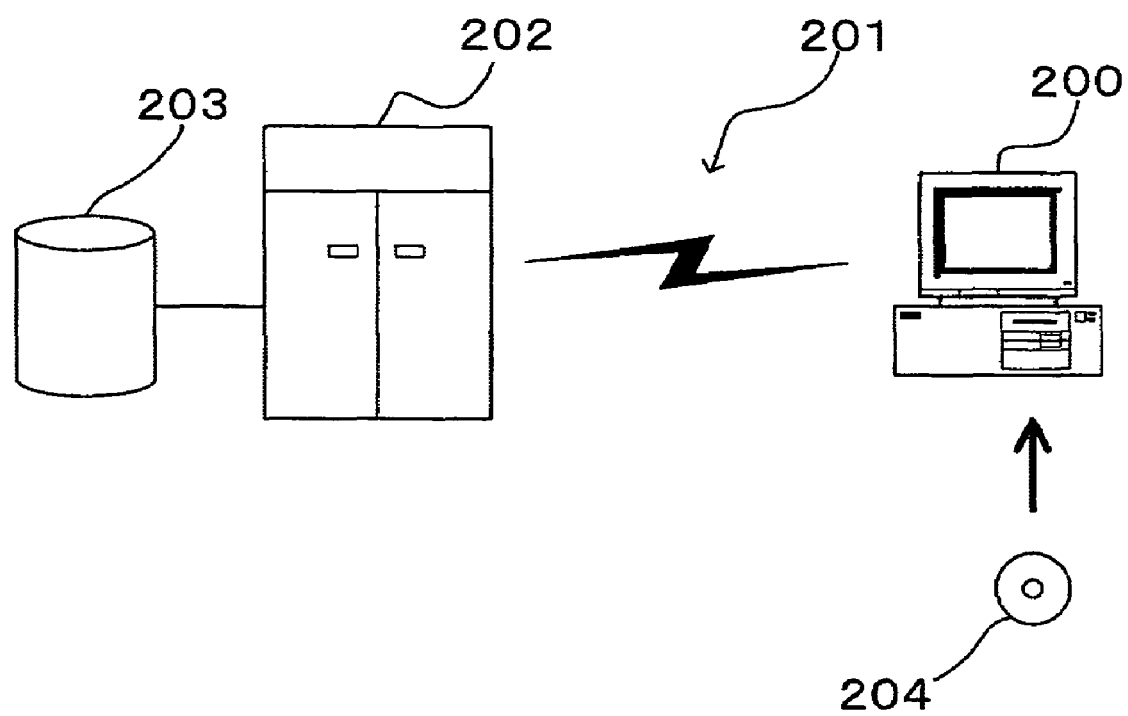

FIG. 14 shows how the program may be provided to a personal computer 200 in a recording medium such as a CD-ROM or through a data signal on the Internet or the like. While reference numeral 200 indicates a personal computer, the program may be provided to the navigation apparatus 1 in a similar manner. The personal computer 200 acquires the program via a CD-ROM 204. The personal computer 200 is also capable of connecting with a communication line 201. A computer 202 is a server computer that provides the program stored in a recording medium such as a hard disk 203. The communication line 201 may be a communication network for Internet communication, personal computer communication or the like or it may be a dedicated communication line. The computer 202 reads out the program from the hard disk 203 and transmits the program to the personal computer 200 via the communication line 201. Namely, the program embodied as a data signal on a carrier wave is transmitted via the communication line 201. Thus, the program can be distributed as a computer-readable computer program product adopting any of various modes including a recording medium and a carrier wave.

While an explanation is given above in reference to the embodiment on an example in which the map data adopt a hierarchical structure through which they are sorted as level 0 through level 6 data, the present invention is not limited to this example and the map data and the search data may adopt a data structure other than that explained earlier. In addition, while data files are created in units of blocks in the explanation provided above, the present invention is not limited to this example and data files may be created in units each comprising a plurality of blocks or in units each corresponding to one of block portions obtained by dividing a block into a plurality of portions. In short, data files should be created each in correspondence to a predetermined map range.

While an explanation is given above in reference to the embodiment on an example in which each file is assigned with an 8-digit file name by adopting the method of latitudinal/longitudinal value-based primary mesh code designation, the present invention is not limited to this example and each file may be assigned with a 12-digit file name which includes an additional division code determined through secondary mesh code designation, or the file may be assigned with a file name designated through another method.

While an explanation is given above in reference to the embodiment on an example in which data files are created in units of blocks and the data are updated in units of the individual data files, the present invention is not limited to this example and any method may be adopted in conjunction with the present invention as long as the update units can be determined in correspondence to each data type. For instance, instead of managing the background data update in units of individual files, the background data update may be managed in units of blocks or meshes.

While an explanation is given above in reference to the embodiment on an example in which the data related to road connections are updated separately from the background data, the present invention is not limited to this example. For instance, the road connection data and the background data at levels 1 through 6 may be handled as similar types of data, and the background data at level 0 alone may be handled as a different type of data in a data update. Namely, the background data at level 0 may be updated in units of predetermined ranges, e.g., in units of blocks, and the road connection data and the background data at levels 1 through 6 may be updated by updating the entire data stored in the hard disk 12 or in units of predetermined ranges greater than the update units for the background data at level 0, since the data volume of the background data at level 0 (town map data) is significantly greater than the volumes of the other types of data. The same principle applies when adding new data.

While an explanation is given above in reference to the embodiment on an example in which the road data are used to pinpoint the current position of the vehicle, the present invention is not limited to this example and the road data may be utilized in displays related to roads. Even in such an application, the road data are still data related to road connections used to determine the current vehicle position. It is to be noted that when the road data are to be used in displays related to roads as well, they need to include road data at levels 1 through 5. Of these, the road data at level 1 are also used as locator data to determine the current vehicle position.

While an explanation is given above in reference to the embodiment on an example in which, when a background data update range is specified at a given level among levels 1 through 6, the background data at all levels 1 through 6 are updated over the specified range, the present invention is not limited to this example. The data at levels 6 and 5, for instance, are fairly wide-area map data. Accordingly, when an update range is specified at a lower-order level, the data at a predetermined level and higher (e.g., level 5 and higher) may not be updated, and the data at the predetermined level or higher may be updated only when an update range is specified for the data at the specific level.

While an explanation is given above in reference to the embodiment on an example in which the search data include category name search data, telephone number search data and street address search data, the present invention is not limited to this example and the search data may be name search data managed in alphabetical order. Namely, the search data may assume any form as long as they are used to locate positions.

An explanation is given above in reference to the embodiment on an example in which, as a specific type of data such as background data, road data, route search data or route guidance data, is selected for a data update, only the selected type of data is updated. Instead, the user may specify an area (range) over which he wishes to have the data updated, and in response, all types of data over the specified area may be updated in the update units explained earlier. In such a situation, the background data, for instance, will be updated over a block corresponding to the specified area, whereas the road data, the route search data and the route guidance data will be updated over the entire ranges of the stored data. In addition, the entire road data, route search data and route guidance data stored in the hard disk may be invariably updated whenever a partial update of the background data is specified in units of blocks.

Alternatively, whenever an update of a specific type of search data such as category name search data, telephone number search data or street address search data is specified, the specified search data may be updated, as has been explained in reference to the embodiment, and the entire road data, Route search data and route guidance data stored in the hard disk may be updated. Furthermore, when a search data update is specified, the background data over the area related to the search data update, too, may be updated in units of blocks.

While an explanation is given above in reference to the embodiment on an example in which data are organized in conformance to the prefecture-based Japanese administrative system, the present invention is not limited to this example and the data may instead be organized in conformance to a global administrative system or in conformance to the administrative system adopted in a specific country or region.

While the invention has been particularly shown and described with respect to a preferred embodiment and a variation thereof by referring to the attached drawings, the present invention is not limited to these examples and it will be understood by those skilled in the art that various changes in form and detail may be made therein without departing from the spirit, scope and teaching of the invention.

INCORPORATION BY REFERENCE

The disclosure of the following priority application is herein incorporated by reference:
Japanese Patent Application No. 2003-389377, filed Nov. 19, 2003.

The invention claimed is:

1. A navigation apparatus, comprising:
a storage device in which first data and second data that are a different type of data from the first data are stored; and
a control device that controls road guidance including map display by using the first data and the second data, wherein:
the control device updates the first data in a first update unit and updates the second data in a second update unit different from the first update unit; and
the first update unit represents a predetermined map range and the second update unit represents a range greater than the predetermined map range.

2. A navigation apparatus according to claim 1, wherein:
the first data are related to map display; and
the second data are related to road connections.

3. A navigation apparatus according to claim 1, wherein:
the first data are background data used for map display; and
the second data are at least one type of data among road data used to locate a position on a road, route search data used in route search and route guidance data used for route guidance.

4. A navigation apparatus according to claim 1, wherein:
the second update unit corresponds to the entire second data stored in the storage device.

5. A navigation apparatus according to claim 4, wherein:
when new data are to be added to the first data, the control device adds the new data to the first data in the first update unit; and
when new data are to be added to the second data, the control device updates the entire second data stored in the storage device and adds the new data to the second data.

6. A navigation apparatus according to claim 1, further comprising:
an input device to which update data to be used to update the first data, output from an update data providing apparatus in the first update unit, and update data to be used to update the second data, output from the update data providing apparatus in the second update unit, are input.

7. A navigation apparatus according to claim 1, further comprising:
a navigation-side update specifying device that specifies at least either the first data or the second data as a type of data to be updated and an update range; and
an output device that outputs to an update data providing apparatus information indicating the specified type of data to be updated and the update range.

8. A navigation apparatus comprising:
a storage device in which first data and second data that are a different type of data from the first data are stored; and
a control device that controls road guidance including man display by using the first data and the second data, wherein:
the control device updates the first data in a first update unit and updates the second data in a second update unit different from the first update unit;
the first data are at least one type of search data among name search data, telephone number search data and street address search data used to locate a position on a map;
the second data are at least one type of data among road data used to locate a position on a road, route search data used in route search and route guidance data used for route guidance;
the first update unit is set so as to update part of the first data stored in the storage device; and
the second update unit corresponds to the entire second data stored in the storage device.

9. An update data providing apparatus that provides update data to be used to update first data and update data to be used to update second data of a data type different from the first data to a navigation apparatus which controls road guidance including map display by using the first data and the second data, comprising:
an update data storage device in which the update data to be used to update the first data and the update data to be used to update the second data are stored;
an update data output device that outputs to the navigation apparatus the update data for the first data in a first update unit and outputs to the navigation apparatus the update data for the second data in a second update unit different from the first update unit; and an output specifying device that specifies either the first data or the second data as a type of update data to be output to the navigation apparatus and an update range, wherein:

the update data output device outputs to the navigation apparatus update data of the specified data type over the specified update range.

10. An update data providing apparatus according to claim 9, wherein:

the first data are related to map display;
the second data are related to road connections; and
the first update unit represents a predetermined map range and the second update unit represents a range greater than the predetermined map range.

11. An update data providing apparatus according to claim 9, wherein:

the first data are background data used for map display;
the second data are at least one type of data among road data used to locate a position on a road, route search data used in route search and route guidance data used for route guidance;
the first update unit represents a predetermined map range; and
the second update unit represents a range greater than the predetermined map range.

12. An update data providing apparatus according to claim 9, wherein:

the first data are at least one type of search data among name search data, telephone number search data and street address search data used to locate a position on a map;
the second data are at least one type of data among road data used to locate a position on a road, route search data used in route search and route guidance data used for route guidance;
the first update unit is set so as to update part of the first data stored in the storage device; and
the second update unit corresponds to the entire second data stored in the storage device.

13. An update data providing apparatus according to claim 9, wherein:

the second update unit corresponds to the entire second data stored in the navigation apparatus.

14. An update data providing apparatus according to claim 13, wherein:

when new data are to be added to the first data at the navigation apparatus, the update data output device outputs the new data to be added to the first data in the first update unit; and
when new data are to be added to the second data at the navigation apparatus, the update data output device outputs update data for the entire second data stored in the navigation apparatus and the new data to be added to the second data.

15. A data update system for a navigation apparatus comprising:

a navigation apparatus comprising:
a storage device in which first data and second data that are a different type of data from the first data are stored;
a control device that controls road guidance including map display by using the first data and the second data, wherein the control device updates the first data in a first update unit and updates the second data in a second update unit different from the first update unit, the first update unit representing a predetermined map range and the second update unit representing a range greater than the predetermined map range; and an update data providing apparatus that provides update data to be used to update first data and update data to be used to update second data of a data type different from the first data to the navigation apparatus which controls road guidance including map display by using the first data and the second data, comprising:
an update data storage device in which the update data to be used to update the first data and the update data to be used to update the second data are stored;
an update data output device that outputs to the navigation apparatus the update data for the first data in a first update unit and outputs to the navigation apparatus the update data for the second data in a second update unit different from the first update unit,
an output specifying device that specifies either the first data or the second data as a type of update data to be output to the navigation apparatus and an update range, wherein:
the update data output device outputs to the navigation apparatus update data of the specified data type over the specified update range.

16. An update data providing method for providing update data to be used to update first data and update data to be used to update second data of a data type different from the first data to a navigation apparatus that controls road guidance including map display by using the first data and the second data, comprising:

specifying at least either the first data or the second data as a type of data to be updated and specifying an update range;
outputting update data for the first data over the specified update range in a first update unit to the navigation apparatus if the first data are specified; and
outputting to the navigation apparatus the update data for the second data over a range containing the specified update range in a second update unit different from the first update unit if the second data are specified.

17. An update data providing method for providing update data to be used to update first data and update data to be used to update second data of a data type different from the first data to a navigation apparatus that controls road guidance including map display by using the first data and the second data, comprising:

displaying a selection screen in which at least either the first data or the second data is selected as a type of data for data update;
displaying information indicating a storage state of at least either the first data or the second data at the navigation apparatus;
displaying an update range specification screen in which an update range over which at least either the first data or the second data are to be updated is specified;
outputting the update data for the first data over the update range having been specified in the update range specification screen to the navigation apparatus in a first update unit if the first data are selected; and
outputting the update data for the second data over a range containing the update range having been specified in the update range specification screen to the navigation apparatus in a second update unit different from the first update unit if the second data are selected.

* * * * *